Patented Jan. 2, 1945

2,366,453

UNITED STATES PATENT OFFICE 2,366,453

DI-TERTIARY ALKYL SULPHIDES

Jacob R. Meadow, Woodbury, N. J., assignor to Socony-Vacuum Oil Company, Incorporated, a corporation of New York No Drawing. Application December 8, 1942,
Serial No. 468,249

12 Claims. (Cl. 260—609)

This invention relates to a method of preparing di-tertiary alkyl sulphides by catalytic synthesis from the corresponding mercaptans.

Many methods for the synthesis of alkyl sulphides have been described, many of them catalytic in nature. These reactions proceed satisfactorily and give good yields in syntheses involving normal and secondary sulphides but are not well adapted for producing tertiary sulphides. I have now discovered a synthesis which appears to result in the specific conversion of tertiary mercaptans to tertiary disulphides. The present reaction comprises the reaction of tertiary mercaptans in the presence of a Friedel-Crafts type catalyst such as hydrogen fluoride, boron fluoride, the halides of aluminum, iron, zinc and the like. Under conditions resulting in the conversion of tertiary mercaptans, the normal and secondary mercaptans are not affected by these catalysts, being recovered practically unchanged.

The reaction appears to be completely reversible, substantially similar products and by-products being obtained from reaction masses resulting from catalyst and mercaptan or catalyst and di-alkyl sulphide. The mercaptan is the predominant compound in either case, i. e., greater in quantity than any other one compound. The sulphide is present in amounts ranging from about 8% to about 20%, together with appreciable quantities of olefin polymers, olefin, H₂S and complex compounds resulting from condensation of olefins and olefin polymers with mercaptans. The differences in quantities of compounds obtained by starting with mercaptan or sulphide may be readily explained by reason of the evolution of hydrogen sulphide during the reaction forming the basis of the invention. The present process appears to proceed according to the reversible equation:

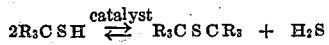

wherein R represents an organic radical. A number of other reactions also proceed in the catalyzed mixture and the side reactions may be typified by the following, postulated for tertiary butyl mercaptan conversion to di-tertiary butyl sulphide and the reverse thereof:

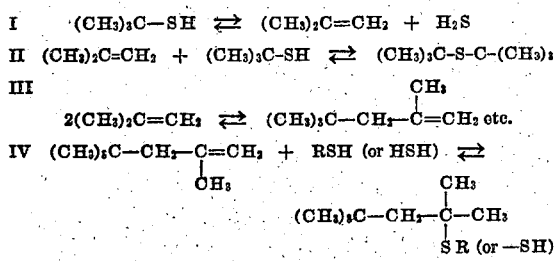

These reactions help to explain the presence of both mercaptan and sulphide usually found in the final product. The proportion of each seems to depend on the equilibrium conditions. When starting with 100% mercaptan, the forward action of Reactions I and II predominate until an appreciable amount of sulphide is produced. However, when starting with 100% sulphide, the reverse of II and the forward action of III and IV predominate.

The nature of the factors affecting equilibria involved in the process tend to support the theory expressed in the above equations. The amount of catalyst should be relatively small. In many catalytic reactions, excessive amounts of catalyst above that required for satisfactory reaction can be condemned only on the ground of waste. The operative catalysts for the present process, however, are also polymerization catalysts and excessive quantity thereof tends to cause undue polymerization of olefins and condensation reactions yielding high boiling compositions.

By-products may result from the action of the catalyst on di-tertiary butyl sulphide which appears to give tertiary butyl mercaptan and iso-butylene as primary products; the formation of "active" isobutylene in the system can thus lead to the addition of either H₂S or mercaptan, or polymerization to give dimers, trimers and tetramers of isobutylene. The latter can also add sulph-hydro-compounds to produce complex mixtures.

In general, sulphide formation is favored by lower temperatures and shorter contact periods. It will be apparent that time, temperature and catalyst concentration cannot be accurately specified for the general reaction; since these factors will naturally vary with the nature of the charge material and catalyst employed. The following specific examples serve to show suitable conditions for reactions within the scope of the invention.

Example I

A mixture of 4 grams anhydrous aluminum chloride and 250 grams dry tertiary butyl mercaptan was placed in a 1-liter round-bottom flask with stirrer and reflux condenser, and agitated two hours at 60–65° C. The exit gases were led first through an ice trap, then into dilute NaOH solution, and finally through a dry ice trap. The crude product was washed with 75 cc. cold water, dried over anhydrous CaCl₂, and fractionated through a 24-inch Vigreaux column. Tertiary butyl mercaptan suitable for reuse was recovered to the extent of 172 grams. The product, di-tertiary butyl sulphide weighed 44 grams; while about 8.5 grams of hydrogen sulphide was absorbed in the caustic soda trap. A 10 gram residue consisted of polymers, higher sulphides, etc. The dry ice trap retained 0.5 gram of isobutylene.

Example II

A mixture of 250 grams tertiary butyl mercaptan and 7 cc. boron trifluoride etherate (containing 0.475 gram BF₃ per cc.) was heated 2½ hours at temperatures ranging between 40 and 48° C. The reaction mass was washed, dried and distilled as in Example I. The yield of di-tertiary butyl sulphide was 21 grams, and 216 grams of the mercaptan was recovered.

Example III

A mixture of 250 grams tertiary butyl mercaptan and 10 cc. boron trifluoride was refluxed 2 hours at 60° to 65° C. Processing of the reaction mixture, as above, resulted in 37 grams of di-tertiary butyl sulphide and 184 grams tertiary butyl mercaptan.

I claim:

1. The process of synthesizing di-tertiary alkyl sulphides which comprises contacting tertiary aliphatic mercaptans with a minor amount of a Friedel-Crafts type catalyst at a relatively low temperature for a relatively short contact time.

2. The process of synthesizing di-tertiary alkyl sulphides which comprises contacting tertiary aliphatic mercaptans with a minor amount of anhydrous aluminum chloride at a relatively low temperature for a relatively short contact time.

3. The process of synthesizing di-tertiary alkyl sulphides which comprises contacting tertiary aliphatic mercaptans with a minor amount of boron trifluoride at a relatively low temperature for a relatively short contact time.

4. The process of synthesizing di-tertiary alkyl sulphides which comprises contacting tertiary aliphatic mercaptans with a minor amount of a metallic halide catalyst of the Friedel-Crafts type at a relatively low temperature for a relatively short contact time.

5. The process of synthesizing di-tertiary butyl sulphide which comprises contacting tertiary butyl mercaptan with a minor amount of a Friedel-Crafts type catalyst at a relatively low temperature for a relatively short contact time.

6. The process of synthesizing di-tertiary butyl sulphide which comprises contacting tertiary butyl mercaptan with a minor amount of anhydrous aluminum chloride at a relatively low temperature for a relatively short contact time.

7. The process of synthesizing di-tertiary butyl sulphide which comprises contacting tertiary butyl mercaptan with a minor amount of boron trifluoride at a relatively low temperature for a relatively short contact time.

8. The process of synthesizing di-tertiary butyl sulphide which comprises contacting tertiary butyl mercaptan with a minor amount of a metallic halide catalyst of the Friedel-Crafts type at a relatively low temperature for a relatively short contact time.

9. The process of synthesizing di-tertiary butyl sulphide which comprises contacting tertiary butyl mercaptan with a minor amount of anhydrous aluminum chloride at a temperature from about 60° C. to about 65° C. for a relatively short contact time.

10. The process of synthesizing di-tertiary butyl sulphide which comprises contacting tertiary butyl mercaptan with a minor amount of boron trifluoride at a temperature from about 60° C. to about 65° C. for a relatively short contact time.

11. The process for synthesizing di-tertiary butyl sulphide which comprises contacting tertiary butyl mercaptan with a minor amount of boron trifluoride etherate at a temperature from about 40° C. to about 48° C. for a relatively short contact time.

12. The process for synthesizing di-tertiary alkyl sulphides which comprise contacting tertiary aliphatic mercaptans with a minor amount of a Friedel-Crafts type at a temperature from about 40° C. to about 65° C. for a relatively short contact time.

JACOB R. MEADOW.